United States Patent [19]

Pudney et al.

[11] Patent Number: 5,071,050
[45] Date of Patent: Dec. 10, 1991

[54] PIVOTABLE CROSS BAR AND STANCHION CONNECTION

[75] Inventors: Richard I. Pudney, Croswell; Brian W. Glombowski, North Street; Christopher M. Hiebert, St. Clair; Gary M. Cronce; Charles R. Schriner, both of Port Huron, all of Mich.

[73] Assignee: Masco Industries, Inc., Taylor, Mich.

[21] Appl. No.: 561,785

[22] Filed: Aug. 2, 1990

[51] Int. Cl.⁵ .................................................. B60R 9/04
[52] U.S. Cl. ...................................... 224/321; 224/322
[58] Field of Search ............... 224/309, 321, 322, 323, 224/324, 325, 326, 327, 328, 329, 330, 331; 403/61

[56] References Cited

U.S. PATENT DOCUMENTS 4,616,771 10/1986 Heideman ........................... 224/321
4,911,348 3/1990 Rasor et al. ..................... 403/61 X Primary Examiner—Henry J. Recla
Assistant Examiner—Glenn T. Barrett
Attorney, Agent, or Firm—Leydig, Voit & Mayer

[57] ABSTRACT

An adjustable mounting for an article restraining cross bar of an automobile luggage rack is provided to interconnect the cross bar to a pair of stanchion members mounted for longitudinal movement along a pair of parallel side rails so that one stanchion may be longitudinally adjusted relative to the other stanchion. A pivot plug is provided which is secured to each end of the cross bar and includes an extending tongue portion having a slot therein. The stanchions each contain a socket adapted to receive the tongue portion of the pivot plug and a fastening screw extends through the socket and tongue slot to secure the plug within the socket while permitting limited inward and outward movement of the tongue within the socket and limited pivotal movement of the plug around the fastening screw disposed in the slot.

10 Claims, 3 Drawing Sheets

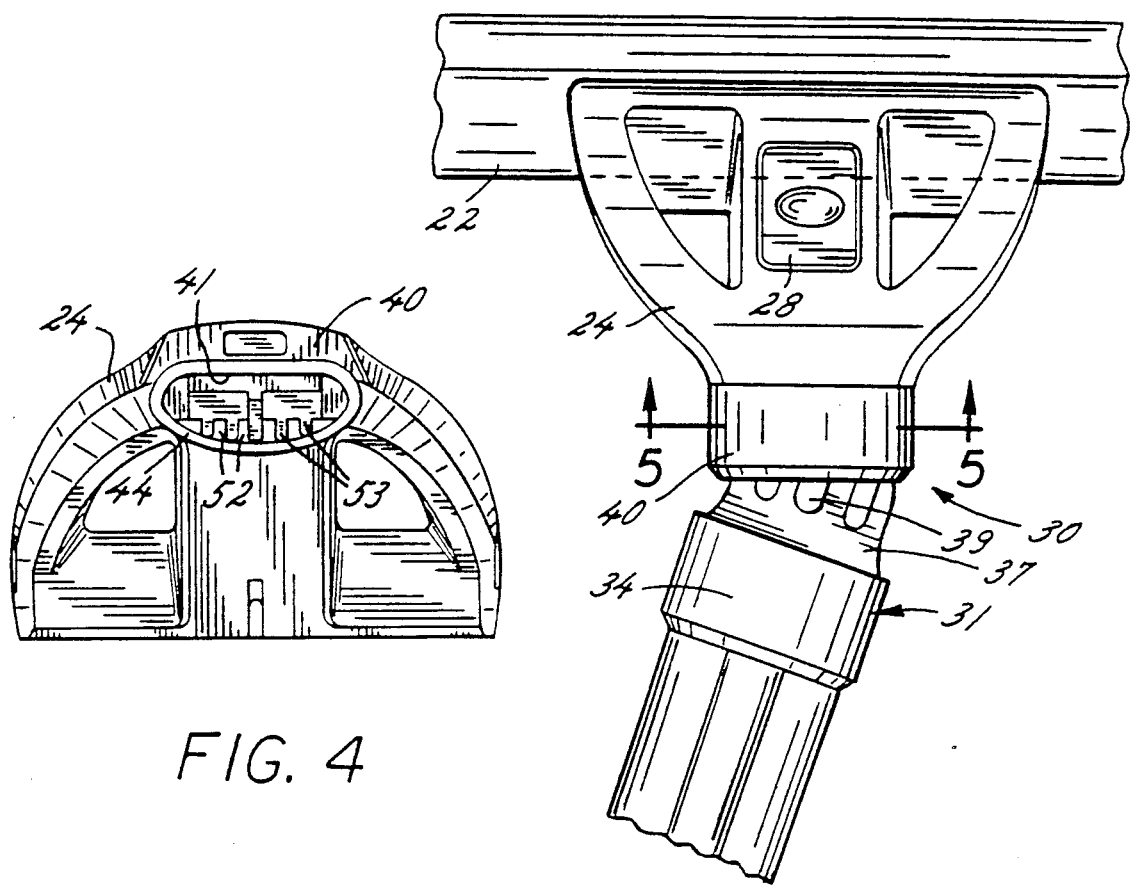
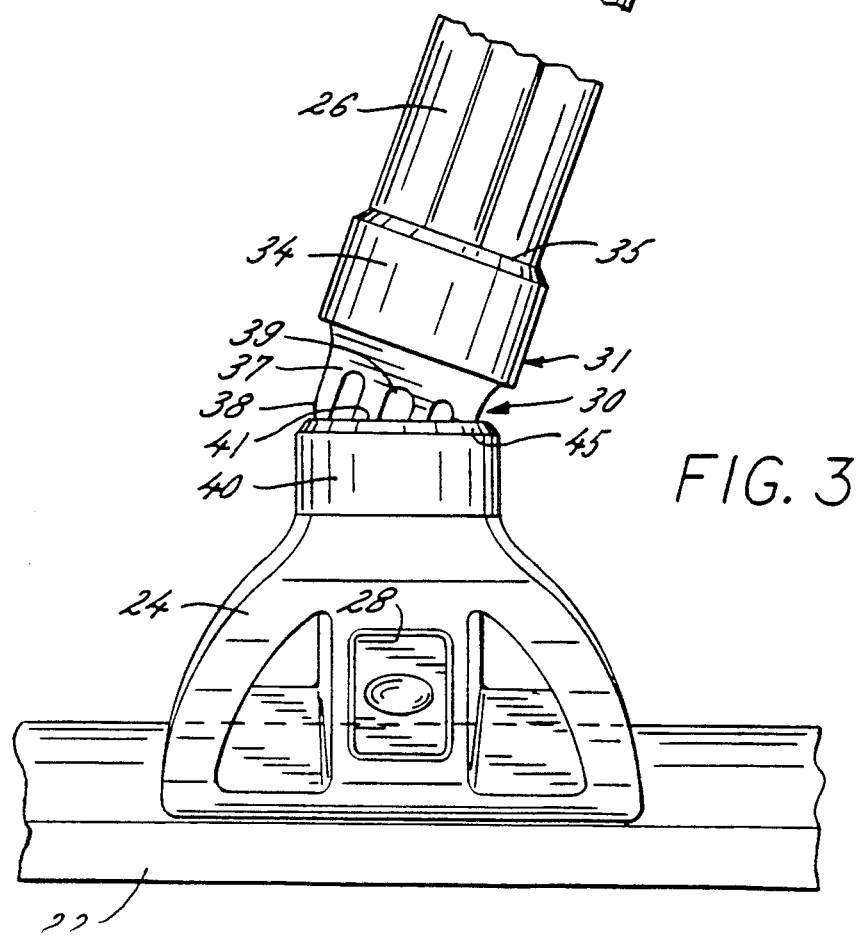
FIG. 4
FIG. 3

PIVOTABLE CROSS BAR AND STANCHION CONNECTION

FIELD OF THE INVENTION

The present invention relates generally to article carriers or luggage racks for mounting on an exterior body surface of automotive vehicles and more particularly concerns a pivotal cross bar and stanchion connection for such racks.

1. Related Applications

This application discloses an article carrier in the form of a luggage rack for automotive vehicles of the same general type as disclosed in copending Mandarino et al. U.S. application Ser. No. 250,705, filed Sept. 28, 1988. The invention herein relates to an improvement in the cross bar and stanchion connection for a luggage rack such as disclosed in that application, for example.

2. Background of the Invention

Racks for carrying luggage and other articles on an exterior surface of automobile vehicles and the like have become quite popular. Typically, such racks and carriers are mounted on the vehicle roof or rear trunk lid, although other surfaces are sometimes used, such as the upper surface of a cap or canopy for a pick-up truck.

There are many prior art patents on such luggage racks and article corners. One general type rack employs raised side rails mounted substantially above the surface of the vehicle on fixed stanchions with either fixed or longitudinally adjustable cross bars therebetween. Bott Re. 26,538 and Re. 26,539 are examples of expired patents of this kind. Ingram U.S. Pat. No. 4,225,068; Kowalski U.S. Pat. Nos. 4,239,138 and 4,279,368 and Mareydt U.S. Pat. No. 4,616,772 are more recent examples disclosing luggage racks and carriers of this general type. Because both the side rails and cross bars are elevated above the roof surface, they tend to create undesirable wind resistance and noise and because they are unsupported between the stanchions, the load carrying capacity of the rails is also somewhat limited.

Another general type of rack or carrier that has met with some commercial acceptance employs relatively flat, low-profile slats along the sides on which longitudinally adjustable stanchions rigidly connected to cross bars are mounted. Bott U.S. Pat. No. 4,516,710 and Re. 32,706 along with their issued parent patents and many of the numerous references cited therein are illustrative of this style rack. Other U.S. Pat. Nos. disclosing racks and carriers of this type are: Ingram U.S. Pat. No. 4,132,335 and 4,244,501; Kowalski et al. 4,372,469; Rasor et al. 406,386; Cronce 4,448,337; Stapleton et al. 4,469,261 and many of the references cited in these patents. The side slats disclosed in these patents are generally characterized as being substantially wider than they are high and have a substantially flat, horizontal upper article carrying surface.

For use with vehicles having roof surfaces with a more rounded contour, Bott U.S. Pat. Nos. 4,684,048 and 4,754,905 disclose carriers having supporting side slats with non-horizontal lower mounting surfaces and upwardly opening channels for receiving generally horizontally disposed liners with flat inwardly directed flanges for supporting articles and longitudinally movable stanchions rigidly connected to cross bars.

More recently, luggage racks have been designed wherein the side rails are supported on the exterior surface of the vehicle but the rails are higher than they are wide and are provided with a decorative trim strip on the outboard side of the rail to present a streamlined aerodynamic and aesthetically pleasing appearance. Such a luggage rack is disclosed in the above-mentioned copending Mandarino et al. U.S. Pat. application Ser. No. 250,705 which also discloses article securing members in the form of crossbar stanchions or tie down elements that are longitudinally movable along the side rails and selectively locked in place at predetermined intermittent locations by a pushbutton lock pin mechanism that engages spaced apart apertures formed along the length of the rails. As disclosed in that application and many of the other prior art patents, identified above, the cross bars which are movable on the side slats or rails are rigidly connected to the stanchions and, as a result, both stanchions must be moved simultaneously or one and then the other must be inched along the slat or rail to move the crossbar to another selected position. Single-handedly adjusting the location of the cross bar can therefore be a difficult task on such prior article carriers and racks.

OBJECTS AND SUMMARY OF THE INVENTION

It is a primary object of the present invention to provide a cross bar and stanchion connection for an article carrier or luggage rack that allows the cross bar to pivot in a horizontal plane so that one stanchion can be slid longitudinally along one of the side slats or rails while the other generally opposing stanchion remains securely in place.

It is a further object of the present invention to provide such an improved cross bar and stanchion connection that is relatively simple in construction, but rugged and trouble-free in use, and which also facilitates the drainage of liquid from the connection between the cross bar and stanchion.

According to the present invention, the cross bar and stanchion connection includes a stanchion having a socket adapted to receive a pivot plug associated with the cross bar. The pivot plug has a collar at one end for receiving the end of the cross bar, and has a tongue with a rounded, radiused edge at the other end. A fastening screw extends up through the bottom of the stanchion socket and into a slot through the pivot plug tongue to secure the pivot plug within the stanchion socket while permitting limited inward and outward movement of the pivot plug with respect to the socket. Additionally, the pivot plug is pivotable about the fastening screw in a horizontal plane thus allowing a stanchion on one end of a cross bar to be adjusted longitudinally along the side rail while the opposite stanchion remains stationary. Preferably, the stanchion socket includes a lower ribbed section to facilitate draining of liquid from the plug-socket connection.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 1 is a partial perspective view of an article carrier including the cross bar and stanchion connection of the present invention as installed on the upper exterior body surface of an automobile vehicle or the like;

FIG. 3 is an enlarged fragmentary top plan view of the cross bar extending between a pair of generally opposed stanchions, with the cross bar shown in its extreme pivoted position as permitted by the stanchion connection of the present invention;

FIG. 4 is a side elevation of one of the stanchions showing its pivot plug receiving socket;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
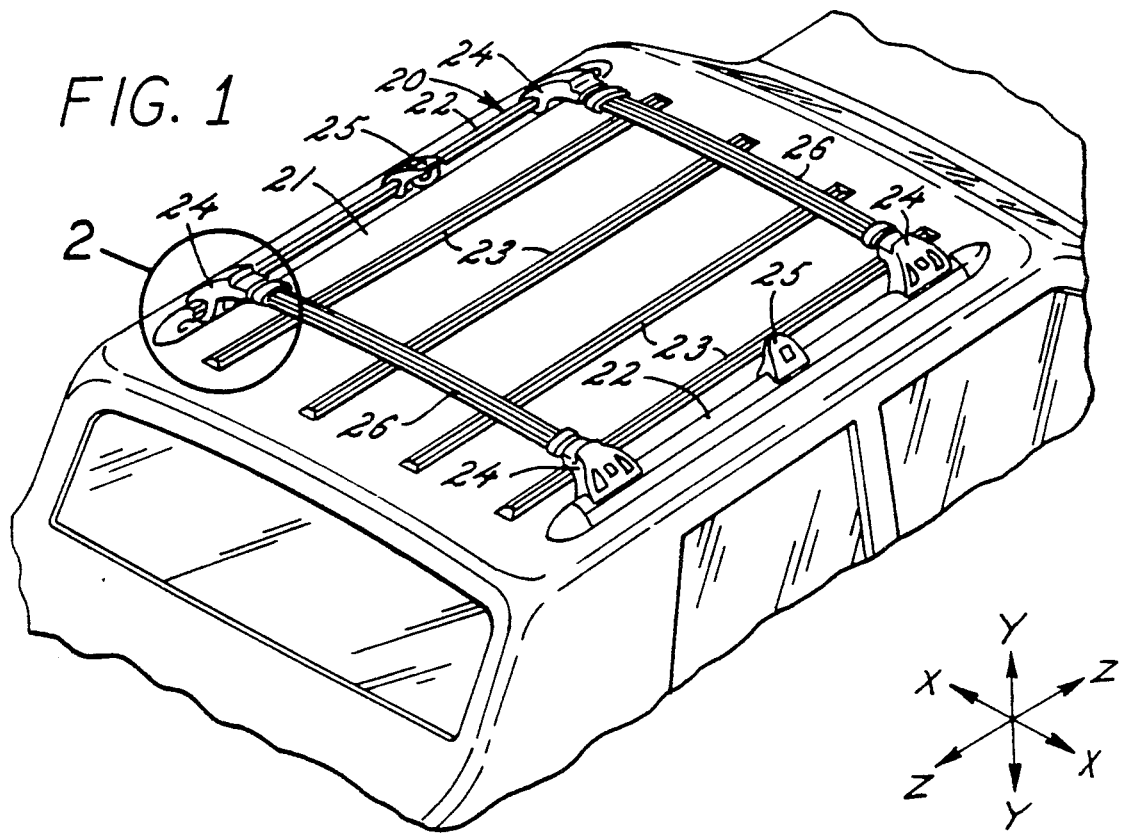

Turning now to the drawings, there is shown in FIG. 1, an article carrier or luggage rack 20 mounted on the exterior body surface 21 of an automobile vehicle or the like. In the embodiment illustrated in FIG. 1, the carrier 20 is shown mounted on the roof portion of the vehicle, but it should be understood that the carrier 20 can also be mounted on other suitable exterior vehicle surfaces such as a trunk lid, for example.

The article carrier 20 includes a pair of elongated side rails 22 adapted to be mounted on the vehicle body surface 21 in spaced-apart parallel relation with respect to the longitudinal center line of the surface 21. As shown in FIG. 1, a plurality of elongated skid strips 23 are adapted to be mounted in spaced-apart parallel relation intermediate the side rails 22. It will be understood that the skid strips 23 are adapted to not only directly support articles or luggage placed within the carrier 20, but also protect the exterior vehicle surface 21 from being marred or scratched by such articles, luggage and the like.

Mounted on each of the side rails 22 are at least one and preferably a plurality of article securing members 24 and 25. In accordance with the present invention, the article securing members 24 are in the form of stanchions mounted on each of the side rails 22 and support raised cross bars 26 between them. The article securing members 25 are in the form of tie down members mounted on each of the side rails 22. It will be understood that each elongated side rail 22 also has a substantially longitudinally extending z axis which is intersected at right angles thereto by a substantially horizontally extending x axis and a substantially vertically extending y axis, as is shown by the arrow diagram in FIG. 2.

In accordance with the disclosure in copending U.S. application, Ser. No. 250,705, assigned to Masco Industries, Inc., each of the side rails 22 of the preferred embodiment is formed with a transverse cross-section having a height greater than its width and the upper surface is formed with a substantial portion thereof sloping downwardly and outwardly with respect to the center line of the vehicle surface 21 and the longitudinal axis z of the side rail 22. Thus, each side rail 22 is formed with an asymmetrical transverse cross-sectional shape and it will be understood that the inboard sides of the respective side rails are adapted to be mounted on the vehicle surface 21 in facing relationship with respect to the center line. It will be appreciated that by making the side rails 22 higher than they are wide, they have greater resistance to vertical bending and, therefore, greater load carrying capacity as compared to the relatively wide and flat slat-like side elements of the prior art such as disclosed in the aforementioned Bott U.S. Pat. No. 4,516,710 and other similar prior art slat-like structures.

Figure 2:
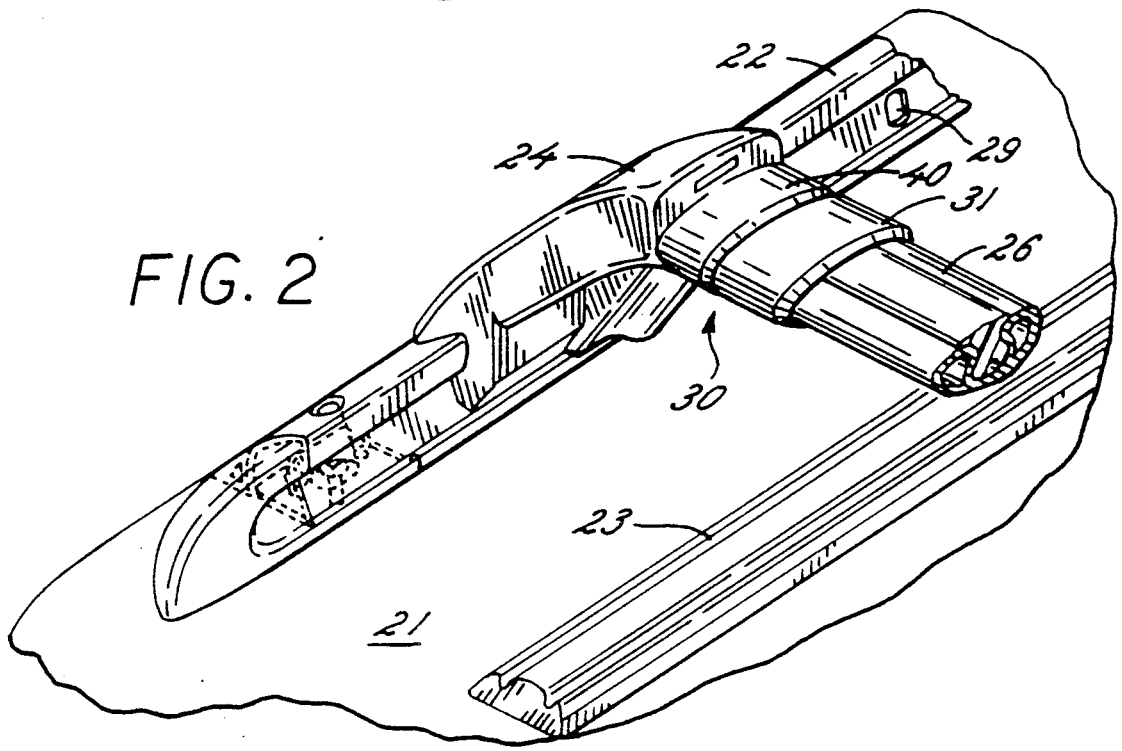
FIG. 2 is an enlarged detail of the circled area 2 in FIG. 1 showing a fragmentary perspective view of one of the side rails including its end cap and an article supporting member including the cross bar and stanchion connection of the present invention.

Pursuant to another feature disclosed in copending application Serial No. 250,705, manually operated locking means are provided to lock the article securing members 24, 25 at selected positions along the side rails 22, while permitting longitudinal movement thereon as shown in FIG. 2 when it is desired to adjust their relative positions. In the preferred embodiment, the locking mechanism includes a manual push button 28 which disengages a lock pin from a series of apertures 29 formed in the side rail 22 when the button is depressed. One form of such a push button with a cam actuating mechanism is disclosed in the above-mentioned U.S. application Ser. No. 250,705. Another and even more preferred pushbutton with a lever actuated lock pin raising mechanism is disclosed in copending U.S. application Ser. No. 561,696, filed on Aug. 1, 1990, and assigned to the same assignee as the present application. It should be appreciated, however, that while such push button - lock pin mechanisms are preferred, other stanchion locking mechanisms such as disclosed in various ones of the prior art patents referred to above may also be employed without departing from the present invention which relates more particularly to the stanchion - cross bar connection described below.

In accordance with the present invention, means are provided for interconnecting the article securing members, or stanchions 24, to the opposite ends of the cross bar 26 to allow limited pivotal movement of the cross bar in a substantially horizontal plane as one of the stanchion members is longitudinally adjusted along one of the side rails 22 relative to the other stanchion member on the other parallel rail as shown in FIG. 3.

In facilitating this limited pivotal movement, the stanchion-cross bar connecting means 30 includes a pivot plug 31 and a corresponding socket 40. In the illustrated embodiment, the pivot plug 31 is secured to the cross bar end 27 and the socket 40 is formed on the stanchion 24. It will be appreciated, of course, that as an alternative arrangement, the cross bar end could contain the socket with the pivot plug extending from the stanchion.

Figure 6:
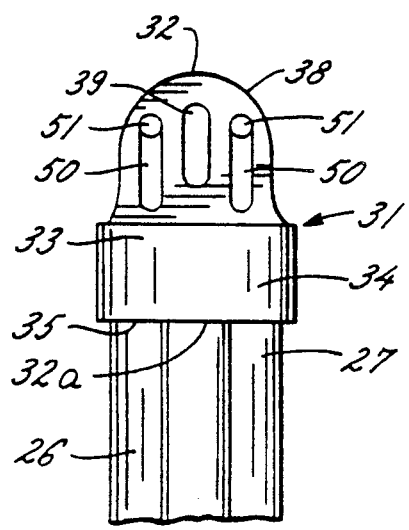
FIG. 6 is a fragmentary top plan view of the cross bar and pivot plug.
Figure 8:
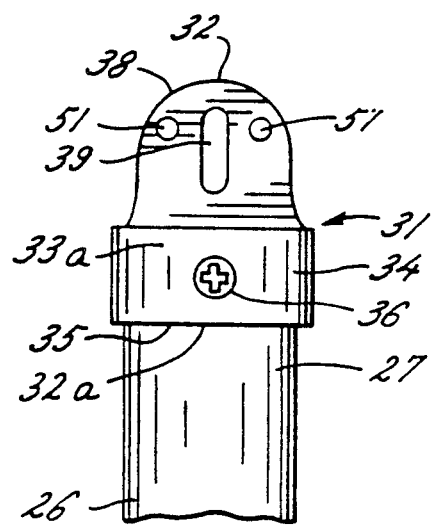
FIG. 8 is a fragmentary bottom plan view of cross bar and pivot plug of the present invention.

As shown in FIGS. 6 and 8, the pivot plug 31 has distal and proximal ends 32 and 32a, respectively, and upper and lower surfaces 33 and 33a, respectively, and is formed with an axially extending collar 34 adjacent its proximal end 32a. The collar portion 34 defines an elliptical sleeve 35 which receives one correspondingly elliptical end 27 of the cross bar 26. A suitable fastener 36, such as a screw, extends through the collar 34, securing the cross bar 26 to the pivot plug 31 as shown in FIG. 8.

Pursuant to the present invention, the pivot plug 31 adjacent the collar 34 includes a tongue portion 37 dimensioned for reception within the socket 40 of the stanchion 24. In the preferred embodiment, the tongue 37 terminates at its distal end 32 in a semicircular radiused edge 38. As shown in FIGS. 6 and 8, a slot 39 extends through the tongue 37 of the pivot plug along its longitudinal center line from near the collar 34 to near the radiused edge 38.

Figure 7:
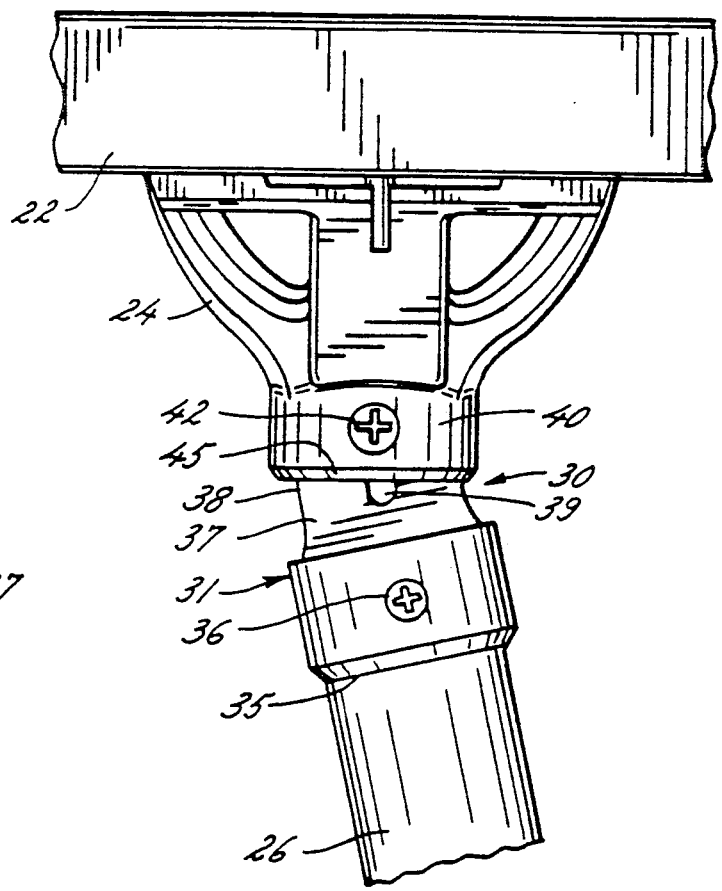
FIG. 7 is a fragmentary bottom plan view of the cross bar, pivot plug, and one of the stanchions illustrating the pivotable positioning of the cross bar with respect to the stanchion from the underside.
Figure 5:
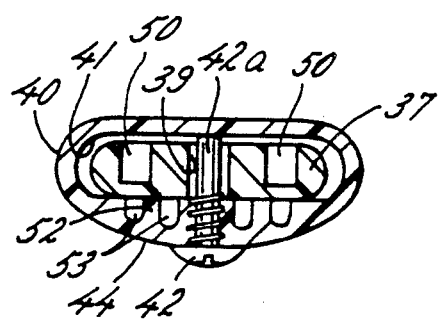
FIG. 5 is a slightly enlarged cross sectional view of the pivot plug and socket connection substantially as seen along line 5—5 in FIG. 4.

According to the primary purpose of the present invention, a socket 40 is formed on the stanchion 24 and defines a generally horizontal groove 41 which extends laterally inward from the stanchion for receiving the tongue portion 37 of the pivot plug 31. In the illustrated embodiment, a fastening device 42, such as a pivot screw, is inserted through a threaded hole in the bottom wall 44 of the socket 40 and passes through the slot 39 in the tongue 37 of the pivot plug 31 to secure the pivot plug tongue 37 within the socket 40 of the stanchion 24 as shown in FIGS. 5 and 7. The pivot plug tongue 37 is thus permitted limited movement into and out of the socket 40, that movement constrained by the pivot screw 42. In addition, and in accordance with the present invention, the rounded, radiused edge 38 of the distal end 32 of the pivot plug tongue is dimensioned to provide clearance between the distal end 32 and the socket 40 thus allows for limited pivoting of the pivot plug about the pivot screw in a horizontal plane as shown in FIG. 7. Preferably, the pivot screw 42 includes a smooth portion 42a which extends through the slot 39 to facilitate smooth movement of the pivot plug 31 within the socket 40 as illustrated in FIG. 5.

It will be understood that by allowing for limited movement of the pivot plug 31 within the socket 40 of the stanchion 24, a stanchion connected to one end of a cross bar 26 can be adjusted longitudinally along the side rail 22 while the other stanchion connected to the opposite end of the cross bar remains fixed as illustrated in FIG. 3. One of the advantages of this arrangement, which permits the relocation of the stanchions individually, is that a person can quickly adjust the cross bar of the article carrier single-handedly.

It should be noted that when a cross bar 26 is positioned at a right angle to the side rails 22, the outer edge 45 of the socket 40 is disposed against the collar 34 of the pivot plug 31.

Pursuant to another feature of the present invention, the upper surface 33 of the pivot plug 31 includes two recesses 50 placed on either side of the slot 39 and in parallel relation thereto. As seen in FIGS. 6 and 8, each recess 50 contains a drain hole 51. Additionally, the socket portion 40 of the stanchion 24 preferably includes vertical ribs 52 in the lower section 44 thereof underlying the pivot plug tongue 37 such that channels 53 are formed between the ribs 52 as shown in FIG. 4. It will be appreciated that the recesses 50 and drain holes 51 of the pivot plug 31 and the channels 53 of the socket 40 serve to reduce the amount of material required for molding the pivot plug and socket while also facilitating the removal of liquid from within the pivot plug-socket connection 30 thus reducing the risk of liquid freezing inside the socket and impairing the pivoting of the pivot plug and cross bar.

We claim as our invention:

1. An article carrier for an automotive vehicle having an exterior body surface, comprising in combination, a pair of elongated parallel rails adapted to be mounted on said exterior body surface, a pair of stanchion members adapted to be mounted for longitudinal movement on said rails and a restraining cross bar having opposite ends extending substantially laterally between and secured adjacent its opposite ends to said stanchion members, means for locking and longitudinally adjusting said stanchions at selected positions along said rails, means for interconnecting said stanchions respectively to said opposite cross bar ends to allow limited pivotal movement of the cross bar in a substantially horizontal plane as one of the stanchion members is longitudinally adjusted along one of said rails relative to the other stanchion member on the other of said rails.

2. An article carrier as defined in claim 1 wherein said interconnecting pivot means includes a pivot plug and socket wherein one of said pivot plug and socket is secured to each end of the cross bar and the other of said pivot plug and socket is secured to and extends laterally inwardly from the stanchion relative to said parallel rails.

3. An article carrier as defined in claim 2 wherein said pivot plug includes a tongue portion having a longitudinal center-line with a slot there along and said socket includes an opening, said tongue portion of the pivot plug dimensioned for reception in said socket opening, and said interconnecting pivot means including fastening means extending through a portion of the socket and the pivot plug slot for securing the pivot plug tongue in the socket and for permitting limited inward and outward movement of the tongue within the socket and limited pivotal movement of the plug around said fastening means disposed in the slot.

4. An article carrier as defined in claim 3 wherein said tongue portion of said pivot plug includes at least one recess having a drain hole adjacent said slot and said socket includes vertical ribs in a lower section thereof underlying the pivot plug to facilitate the draining of liquid from the pivot plug and socket connection.

5. An article carrier as defined in claim 3 wherein the pivot plug tongue is formed with rounded distal end means for providing clearance between said distal end and said socket during said limited horizontal pivotal movement of the cross bar.

6. An article carrier as defined in claim 3 wherein said pivot plug is formed with an axially extending collar adjacent a proximal end and said collar is dimensioned to receive one end of the cross bar therein.

7. An article carrier as defined in claim 3 wherein said socket is formed on the stanchion and defines a generally horizontal groove which extends laterally inwardly from the stanchion for receiving the tongue portion of the pivot plug.

8. An adjustable mounting for an article restraining cross bar of an automobile luggage rack having a pair of elongated parallel side rails with at least one stanchion mounted for longitudinal movement on each side rail and means for locking the stanchions in selected positions along the side rails, comprising in combination, means for interconnecting opposed ones of said stanchions, respectively, to opposite ends of said cross bar to allow limited pivotal movement of the cross bar in a substantially horizontal plane incident to longitudinal movement of one of the stanchions along one of the rails relative to the longitudinal position of the opposed stanchion on the other rail, said interconnecting means including a complementary pivot plug and socket combination one of which is secured to each end of the cross bar and the other of which is secured to each of the stanchions and extends laterally inwardly therefrom, and fastening means for securing said respective plug and socket members together for permitting limited inward and outward movement of the plug relative to the socket as well as limited horizontal pivotal movement of the plug around said fastening means.

9. An adjustable cross bar mounting as defined in claim 8 wherein the socket defines a generally horizontal groove in the stanchion and the plug is secured to the end of the cross bar and defines a tongue dimensioned to fit within said socket groove.

10. An adjustable cross bar mounting as defined in claim 9 wherein the tongue includes a slot which extends along its longitudinal center, said fastening means is disposed in said slot and said tongue is formed with a rounded distal end means for providing clearance between said distal end and said socket groove during said limited horizontal pivotal movement of the cross bar.

* * * * *